United States Patent
Takase et al.

(10) Patent No.: US 11,912,205 B2
(45) Date of Patent: Feb. 27, 2024

(54) WORKING VEHICLE

(71) Applicant: KUBOTA CORPORATION, Osaka (JP)

(72) Inventors: Shunya Takase, Sakai (JP); Hiroki Suga, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 306 days.

(21) Appl. No.: 17/554,079

(22) Filed: Dec. 17, 2021

(65) Prior Publication Data
US 2022/0105874 A1     Apr. 7, 2022

Related U.S. Application Data

(63) Continuation of application No. PCT/JP2020/033252, filed on Sep. 2, 2020.

(30) Foreign Application Priority Data

Sep. 6, 2019  (JP) ................. 2019-163350

(51) Int. Cl.
*A01B 69/00* (2006.01)
*B60R 11/00* (2006.01)
(Continued)

(52) U.S. Cl.
CPC ............ *B60R 11/00* (2013.01); *A01B 69/008* (2013.01); *B62D 6/001* (2013.01); *G05D 1/0278* (2013.01);
(Continued)

(58) Field of Classification Search
CPC .............. A01B 69/008; B60R 11/0258; B60R 2011/0042; B60R 2011/0085;
(Continued)

(56) References Cited

U.S. PATENT DOCUMENTS

2017/0305360 A1   10/2017   Zajac
2019/0317521 A1   10/2019   Nishi et al.

FOREIGN PATENT DOCUMENTS

EP       4228089 A1 *   8/2023   ............ B60R 11/02
JP       48-105436 U     12/1973
(Continued)

OTHER PUBLICATIONS

Official Communication issued in International Patent Application No. PCT/JP2020/033252, dated Oct. 13, 2020.
(Continued)

*Primary Examiner* — Erick R Solis
(74) *Attorney, Agent, or Firm* — Keating & Bennett, LLP

(57) ABSTRACT

A position detector is supported to be movable between a first position and a second position lower than the first position. A mounting stay is below the position detector when the position detector is in the first position, and, when the position detector is rotated together with the mounting stay from a state in which the position detector is in the first position, the position detector is moved to the second position and the mounting stay is positioned above the position detector in the second position and covers over the position detector so as to restrain the automatic steering control.

6 Claims, 14 Drawing Sheets

(51) Int. Cl.
  *B62D 6/00* (2006.01)
  *B62D 49/00* (2006.01)
  *A01B 69/04* (2006.01)
  *G05D 1/00* (2006.01)
  *B62D 33/06* (2006.01)

(52) U.S. Cl.
  CPC ... *B60R 2011/004* (2013.01); *B60R 2011/005* (2013.01); *B60R 2011/0085* (2013.01); *B62D 33/0617* (2013.01); *B62D 49/00* (2013.01); *G05D 2201/0201* (2013.01)

(58) Field of Classification Search
  CPC .... B62D 6/001; B62D 33/0617; B62D 49/00; G05D 1/0278; G05D 2201/0201
  USPC .......................................... 701/23–27, 41, 44
  See application file for complete search history.

(56) References Cited

FOREIGN PATENT DOCUMENTS

| JP | 2009-121856 A | 6/2009 |
| JP | 2018-114925 A | 7/2018 |
| JP | 2018-139564 A | 9/2018 |
| JP | 2019-070544 A | 5/2019 |
| JP | 2019-106942 A | 7/2019 |
| WO | 2018/135201 A1 | 7/2018 |
| WO | 2019/124258 A1 | 6/2019 |

OTHER PUBLICATIONS

Official Communication issued in corresponding Indian Patent Application No. 202117058832, dated Jun. 27, 2022.

\* cited by examiner

WORKING VEHICLE

This application is a continuation application of International Application No. PCT/JP2020/033252, filed on Sep. 2, 2020, which claims the benefit of priority to Japanese Patent Application No. 2019-163350, filed on Sep. 6, 2019. The entire contents of each of these applications are hereby incorporated herein by reference.

BACKGROUND OF THE INVENTION

1. Field of the Invention

The present invention relates to working vehicles such as tractors, for example.

2. Description of the Related Art

Conventionally, the working vehicle disclosed in Japanese Unexamined Patent Publication No. 2018-114925 has been known.

The working vehicle disclosed in Japanese Unexamined Patent Publication No. 2018-114925 has a position detector which detects a position of a vehicle body based on a signal transmitted from a positioning satellite and a controller capable of acquiring detection information of the position detector. The controller performs automatic steering control of automatically controlling steering of the vehicle body based on the detection information of the position detector.

SUMMARY OF THE INVENTION

Meanwhile, when the position detector can be moved to a first position, which is a position for use, and a second position, which is a position lower than the first position, if automatic steering control is performed with the position detector forgotten to be moved to the first position and kept in the second position, a problem arises in which automatic steering control cannot be performed with high accuracy.

Preferred embodiments of the present invention each prevent automatic steering control from being performed with a position detector being in a second position.

A working vehicle according to one aspect of a preferred embodiment of the present invention may include a vehicle body, a position detector to detect a position of the vehicle body based on a signal transmitted from a positioning satellite, a controller configured or programmed to perform an automatic steering control in which steering of the vehicle body is automatically controlled based on detection information detected by the position detector, a restraint to restrain the automatic steering control, and a support bracket to support the position detector, wherein the position detector is supported by the support bracket so as to allow the position detector to be moved between a first position where the position detector is used and a second position lower than the first position, the restraint is operable to restrain the automatic steering control when the position detector is in the second position, the support bracket includes a pivotal shaft and a mounting stay rotatable around the pivotal shaft, the mounting stay being structured to have the position detector mounted thereon, the mounting stay includes a plate that reflects the signal transmitted from the positioning satellite so that the mounting stay defines and functions as the restraint, and the mounting stay is disposed below the position detector when the position detector is in the first position, and, when the position detector is rotated from the first position together with the mounting stay around the pivotal shaft, the position detector is moved to the second position and the mounting stay is positioned above the position detector in the second position and covers over the position detector so as to restrain the automatic steering control.

Also, the support bracket may include a base stay including a plate that includes a plate surface, the base stay being attached to the vehicle body side so as to face the plate surface up or down, and the mounting stay, when the position detector is in the first position, is placed on the base stay and is pivotally supported at a front portion thereof by the base stay via the pivotal shaft so as to be rotatable around an axis of the pivotal shaft extending in a vehicle width direction.

Also, the mounting stay may include a main plate portion attached to the position detector, a first extending plate portion extending in one lateral direction from the main plate portion, and a second extending plate portion extending in another lateral direction opposite to the one lateral direction from the main plate portion.

Also, the position detector may include a detection sensor to detect that the position detector is in the second position.

Also, a display may be provided to indicate that the detection sensor has detected the second position.

Also, a working vehicle according to a preferred embodiment of the present invention may further include a cabin mounted on the vehicle body and provided with a roof at an upper portion thereof, and a first bar and a second bar each of which extends along the vehicle width direction above the roof and which are juxtaposed forward and rearward, wherein the base stay is fixed to the first bar and the second bar.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
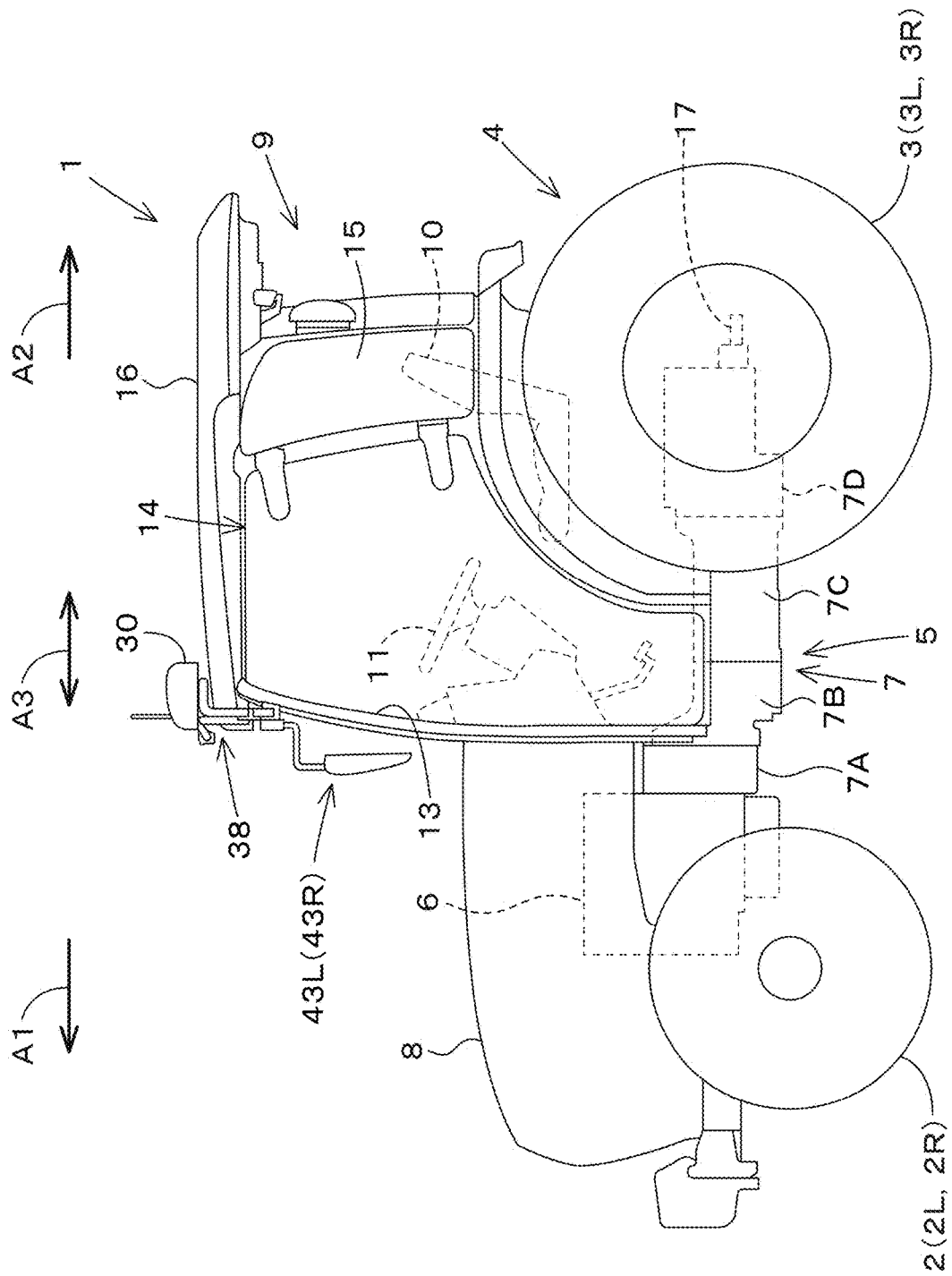
FIG. 1 is a side view of a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

In the following, preferred embodiments of the present invention are described with reference to the drawings as appropriate.

Figure 2:
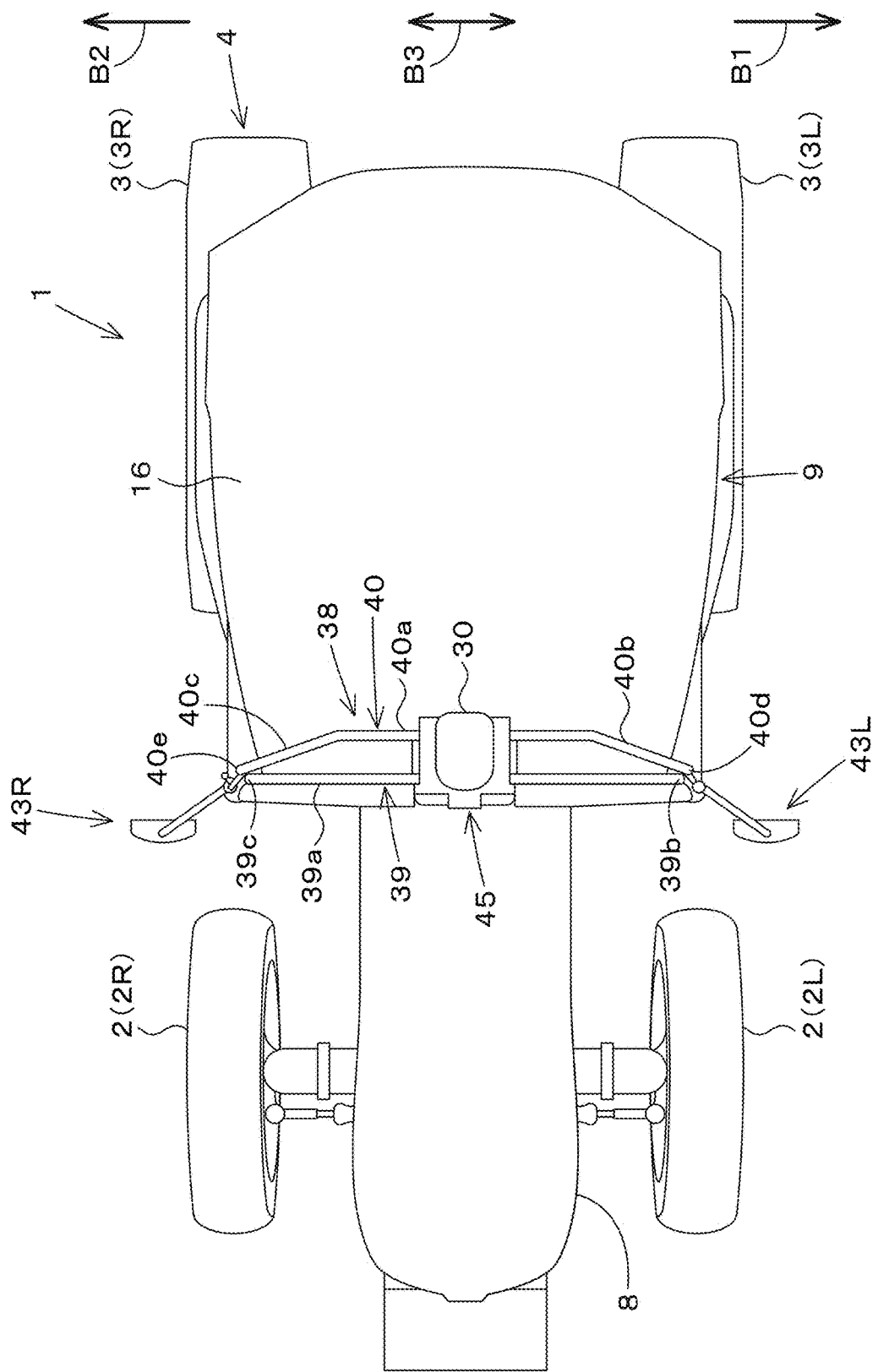
FIG. 2 is a plan view of the working vehicle.

FIG. 1 is a schematic side view depicting an entire structure of a working vehicle 1 according to a preferred embodiment of the present invention. FIG. 2 is a schematic plan view of the working vehicle 1. In the present preferred embodiment, a tractor is exemplarily described as the working vehicle 1. However, the working vehicle 1 is not limited to a tractor but may be agricultural machine (agricultural vehicle) such as a combine or transplanter or may be construction machine (construction vehicle) or the like such as a loader working machine.

In the present preferred embodiment, description is made by taking an arrow A1 direction (forward traveling direction of the tractor 1) in FIG. 1 and FIG. 2 as forward, an arrow A2 direction (rearward traveling direction of the tractor 1) in FIG. 1 and FIG. 2 as rearward, and an arrow A3 direction in FIG. 1 and FIG. 2 as a fore-and-aft direction. Therefore, a front surface side of FIG. 1 is leftward (arrow B1 direction in FIG. 2), and a back surface side of FIG. 1 (arrow B2 direction in FIG. 2) is rightward. Also, description is made by taking a horizontal direction orthogonal to the fore-and-aft direction A3 as a vehicle width direction (arrow B3 direction in FIG. 2), which is a width direction of a tractor 1 (working vehicle). Description is made by taking a direction from a central portion to a right portion of the tractor 1 in the vehicle width direction B3 or a direction to a left portion thereof as outward in the vehicle width direction. In other words, outward in the vehicle width direction is the vehicle width direction B3 away from the center of the tractor 1 in the width direction. Description is made by taking a direction opposite to outward in the vehicle width direction as inward in the vehicle width direction. In other words, inward in the vehicle width direction is the vehicle width direction B3 approaching the center of the tractor 1 in the width direction.

As depicted in FIG. 1, the tractor 1 includes a vehicle body 5. The vehicle body 5 includes a prime mover 6 and a power transmission case 7. The prime mover 6 is a diesel engine. The prime mover 6 may be a gasoline engine or electric motor, or may be of a hybrid type having an engine and an electric motor. The prime mover 6 is disposed at a front portion of the tractor 1 and covered with a bonnet 8.

The power transmission case 7 includes a plurality of cases 7A to 7D sequentially coupled to each other in the fore-and-aft direction A3. The foremost case 7A is coupled to a rear portion of the prime mover 6. Provided inside the power transmission case 7 are a traveling-system power transmission mechanism which transmits power of the prime mover E1 to a traveling device 4 and a working-system power transmission mechanism which transmits power of the prime mover E1 to a power takeoff shaft (PTO shaft) 17.

As depicted in FIG. 1 and FIG. 2, the vehicle body 5 is capable of traveling. In detail, the vehicle body 5 is supported by, for example, a wheel-type traveling device 4 including a plurality of wheels so as to be able to travel. The plurality of wheels include paired front wheels 2 (2L, 2R) provided leftward and rightward of a front portion of the vehicle body 5 and paired rear wheels 3 (3L, 3R) provided leftward and rightward of a rear portion of the vehicle body 5.

As depicted in FIG. 1, the tractor 1 includes a cabin 9. The cabin 9 is mounted on a rear portion of the vehicle body 5. In a rear portion of the interior of the cabin 9, an operator's seat 10 where an operator (operator) sits is provided. A steering wheel 11 to steer the front wheels 2 (2L, 2R) is provided forward of the operator's seat 10. A brake pedal (brake operation tool) 12 to brake the traveling device 4 is provided downward and rightward of the steering wheel 11. A front surface of the cabin 9 is provided with a front glass. A back surface of the cabin 9 is provided with a rear glass. On each of side surfaces (left side surface and right side surface) of the cabin 9, an entrance 13 through which the operator gets on and off the cabin 9 and an entrance door 14 covers the entrance 13 to open and close the entrance 13. A rear side glass 15 is provided rearward of the entrance door 14. Also, the cabin 9 is provided at an upper portion thereof with a roof 16 defining a ceiling portion of the cabin 9.

Figure 3:
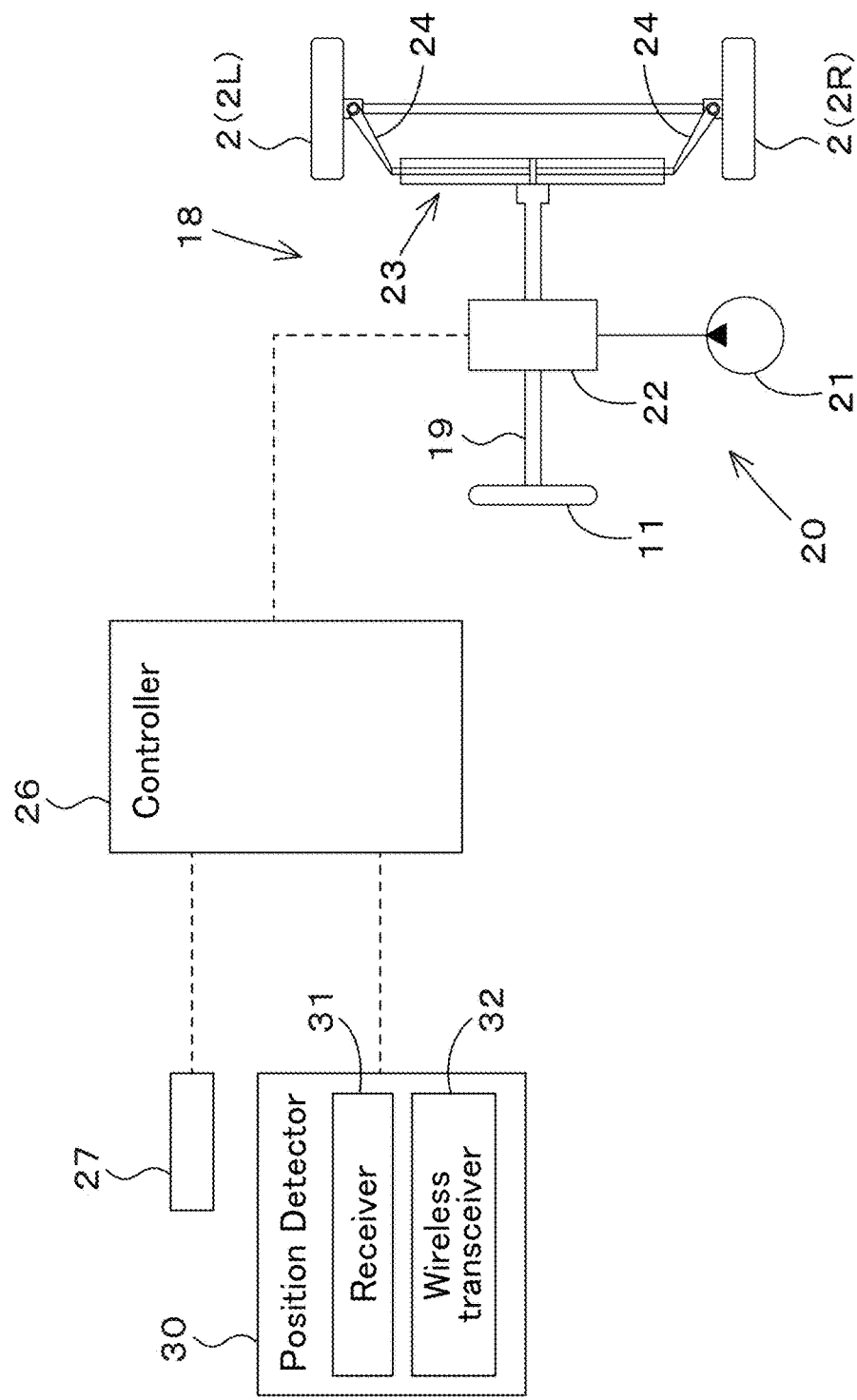
FIG. 3 is a structural diagram depicting a partial structure and a control-system block diagram of the working vehicle.

Here, with reference to FIG. 3, description is made on a schematic structure of a traveling system and a schematic structure of a control system of the tractor 1.

As depicted in FIG. 3, the tractor 1 includes a steering device 18. The steering device 18 is capable of manual steering of steering the vehicle body 5 with operation by the operator and automatic steering of automatically steering the vehicle body 5 without operation by the operator. The steering device 18 includes the steering wheel 11 and a rotation shaft 19 (steering shaft) which rotates with rotation of the steering wheel 11. Also, the steering device 18 includes an assist mechanism (power steering mechanism) 20 which assists steering of the steering wheel 11. In detail, the assist mechanism 20 includes a hydraulic pump 21, a control valve 22 to which a hydraulic fluid delivered from the hydraulic pump 21 is supplied, and a steering cylinder 23 which becomes actuated by the control valve 22. The control valve 22 may be a three-position changeover valve that is switchable with the movement of a spool or the like, and is switched in accordance with the steering direction (rotating direction) of the rotation shaft 19. Also, the control valve 22 may also be a solenoid valve which becomes actuated based on a control signal. The steering cylinder 23 is connected to an arm (knuckle arm) 24 for changing the orientation of the front wheels 2.

When the operator holds and operates the steering wheel 11 in one direction or another direction, the switching position and the degree of opening of the control valve 22 are switched in accordance with the rotating direction of the steering wheel 11 and, a piston rod of the steering cylinder 23 moves to left or right in accordance with the switching position and the degree of opening of the control valve 22. This can change the turning direction (steering direction) of the front wheels 2. That is, the vehicle body 5 can change the forwarding direction to left or right by manual steering operation of the steering wheel 11. Note that the above-described steering device 18 is one example and is not limited to have the above-described structure.

As depicted in FIG. 3, the tractor 1 includes a controller 26. The controller 26 includes a microprocessor having a CPU (Central Processing Unit), an EEPROM (Electrically Erasable Programmable Read-Only Memory), and so forth.

The controller 26 is configured or programmed to perform various controls for the tractor 1. A state detection device 27 which detects a driving state and so forth of the tractor 1 is connected to the controller 26. The state detection device 27 is, for example, a device which detects a state of the traveling system, and detects states of, for example, a crank sensor, a cam sensor, an engine rotation sensor, an accelerator sensor, a vehicle-speed sensor, a steering-angle sensor, and a later-discussed position detector 30. The state detection device 27 may be a sensor to detect a state of another than the traveling system, for example, it may be a lifting lever detection sensor or a PTO rotation detection sensor. The controller 26 performs control of the traveling system and control of the working system in the tractor 1. The controller 26 controls, for example, the number of revolutions of the prime mover 6 (engine), the steering angle of the steering device 18, and so forth based on the detection state detected by the state detection device 27. Also, the state detection device 27 performs control of lifting with the lifting device which lifts the working machine attached to the tractor 1, the number of PTO rotations, and so forth based on the detection state detected by the state detection device 27.

Connected to the controller 26 is the position detector 30 which detects the position of the vehicle body 5 (tractor 1) based on a signal (satellite signal) transmitted from a positioning satellite. The controller 26 is capable of acquiring detection information (position) detected by the position detector 30. The position detector 30 is detects its own position (positioning information including a latitude and a longitude) by the satellite positioning system (positioning satellite). That is, the position detector 30 receives a satellite signal (a position of the positioning satellite, a transmission time, correction information, and so forth), which is a signal transmitted from the positioning satellite, and detects the position (for example, latitude and longitude) based on the satellite signal.

Also, the position detector 30 finds the position and azimuth of the vehicle body 5 by using a known GPS (Global Positioning System), which is one example of a global navigation satellite system (GNSS). Note that position detector 30 may be a satellite positioning system such as GLONASS, HOKUTO, GALILEO, or MICHIBIKI.

As depicted in FIG. 3, the position detector 30 includes, for example, a receiver 31 and a wireless transceiver 32.

The receiver 31 includes an antenna and so forth, and receives a satellite signal transmitted from a positioning satellite.

The wireless transceiver 32 includes an antenna and so forth, and communicates with a base station (reference station) installed at a known position. The base station transmits positioning data (correction information) acquired by receiving electric waves from the positioning satellite to the position detector 30. The position detector 30 receives electric waves transmitted from the positioning satellite and positioning data transmitted from the base station, and detects its own position (latitude and longitude) based on positioning data acquired by receiving the electric waves from the positioning satellite and the positioning data from the base station.

Note that the position detector 30 may not necessarily include the wireless transceiver 32. Also, the position detector 30 may not include an inertial measurement unit 33, which will be described further below.

The controller 26 performs automatic steering control of automatically controlling steering of the vehicle body 5 based on the detection information detected by the position detector 30.

When automatic steering control is performed, a traveling reference line is first set and, after the traveling reference line is set, a planned traveling line parallel to the traveling reference line is set, thus allowing automatic steering control to be performed.

In automatic steering control, steering of the tractor 1 (vehicle body 5) in the forwarding direction is automatically performed so that the vehicle-body position measured by the position detector 30 and the planned traveling line. Specifically, before automatic steering control is performed, the tractor 1 (vehicle body 5) is moved to a predetermined position in an agricultural field, and when the operator performs operation on a steering changeover switch (registration switch) provided to the tractor 1 at the predetermined position, the vehicle-body position measured by the position detector 30 is set as a start point of the traveling reference line. Also, the tractor 1 (vehicle body 5) is moved from the start point of the traveling reference line and, when the operator performs operation on the steering changeover switch at a predetermined position, the vehicle-body position measured by the position detector 30 is set as an end point of the traveling reference line. A straight line connecting the start point and the end point is set as a traveling reference line.

After the traveling reference line is set, for example, when the tractor 1 (vehicle body 5) is moved to a location different from the location where the traveling reference line is set and the operator performs operation on the steering changeover switch, a planned traveling line, which is a straight line parallel to the traveling reference line, is set. After the planned traveling line is set, automatic steering control starts, and the forwarding direction of the tractor 1 (vehicle body 5) is changed so as to be along the planned traveling line.

Figure 4:
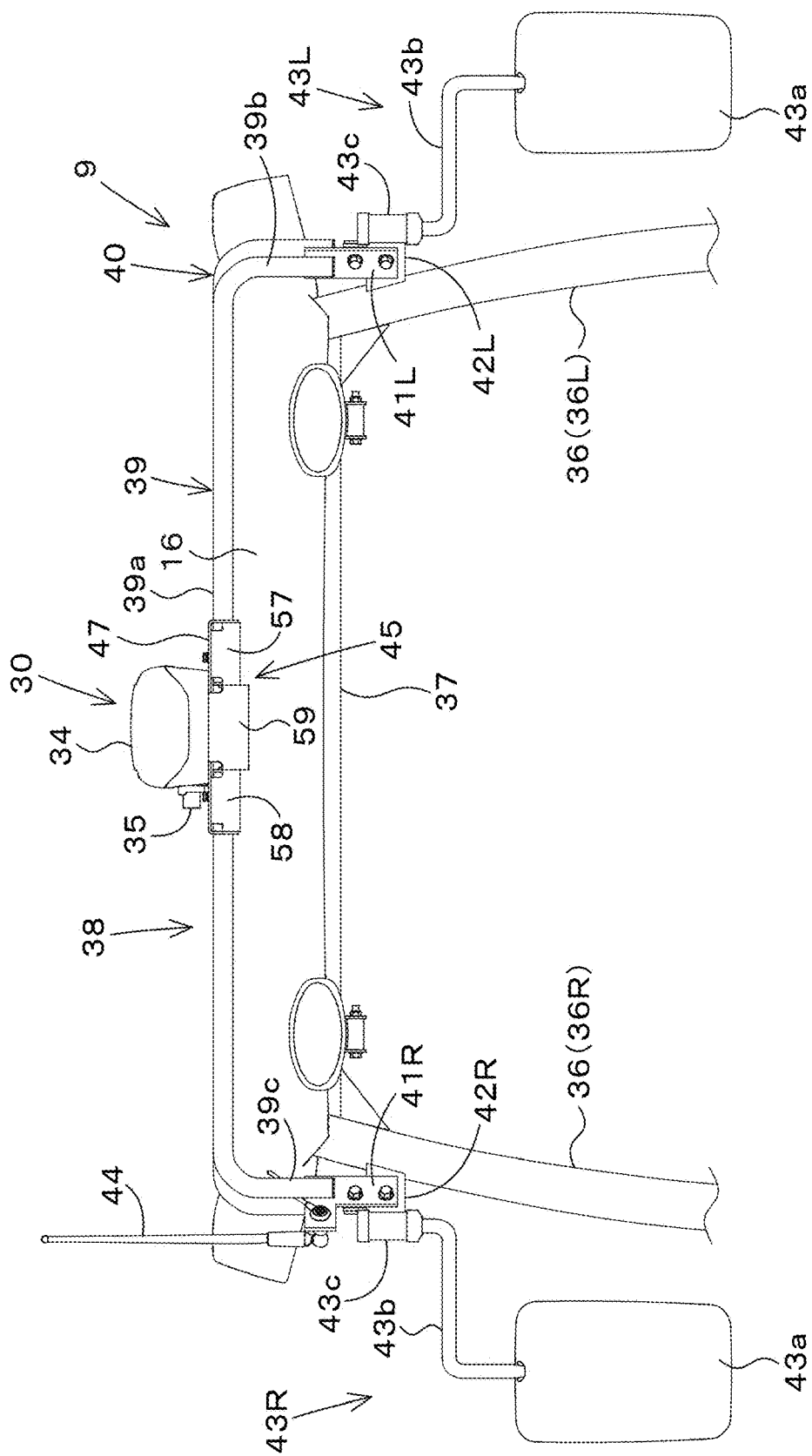
FIG. 4 is a front view of an upper portion side of a cabin.
Figure 5:
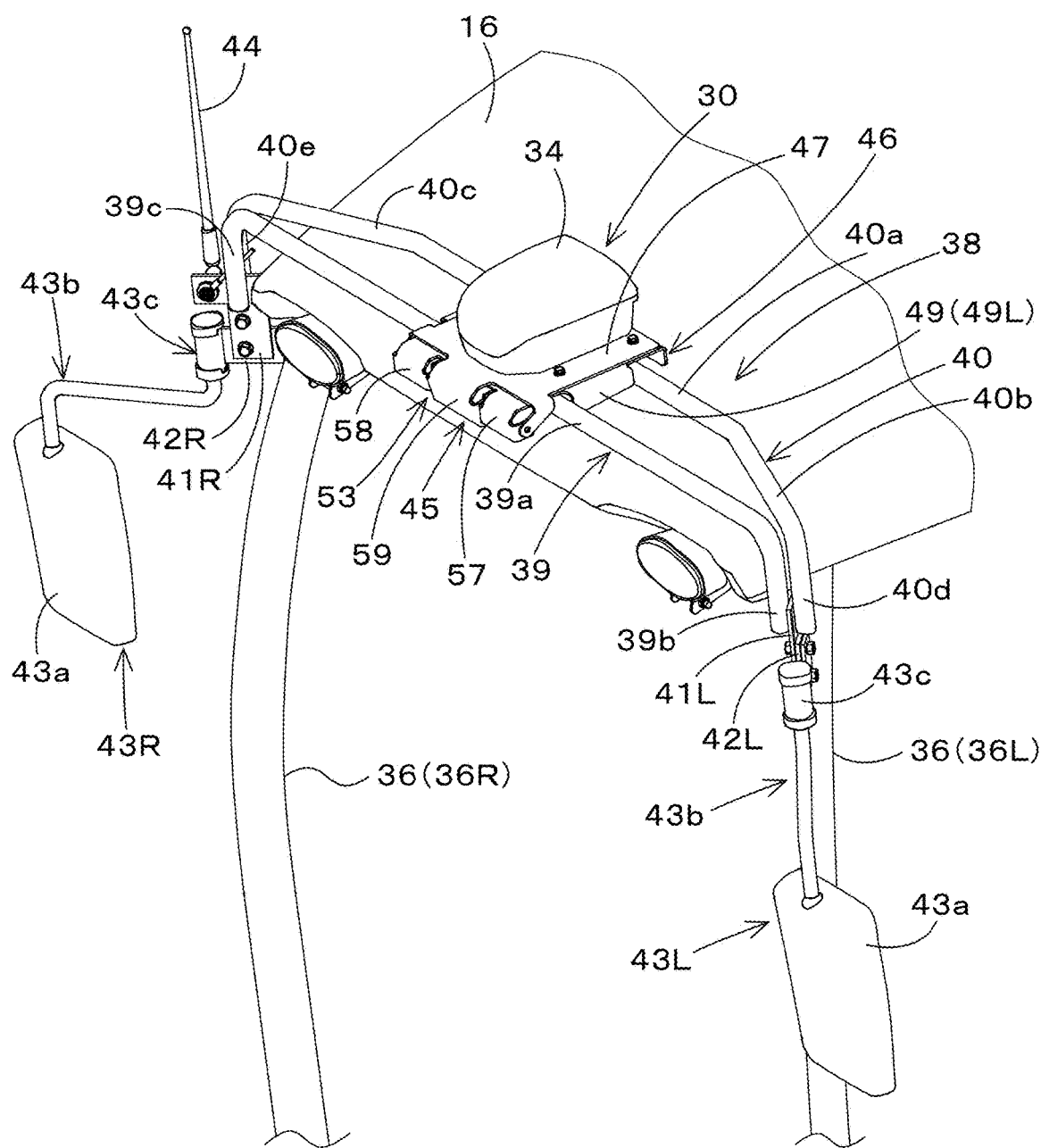
FIG. 5 is a perspective view of the cabin viewed from a front side.

As depicted in FIG. 4 and FIG. 5, the cabin 9 includes front pillars 36 at a front portion. The front pillars 36 includes a first front pillar 36L positioned on one side (left side) in the vehicle width direction B3 of the front portion of the cabin 9 and a second front pillar 36R positioned on the other side (right side) in the vehicle width direction B3 of the front portion of the cabin 9. The front glass is provided between the first front pillar 36L and the second front pillar 36R. Upper portions of the first front pillar 36L and the second front pillar 36R are coupled to each other by a front upper frame 37.

As depicted in FIG. 4 and FIG. 5, the position detector 30 is mounted on a support frame 38 provided from the upper portion of the first front pillar 36L over the upper portion of the second front pillar 36R. The position detector 30 is configured to accommodate the receiver 31, the wireless transceiver 32, and so forth in a case 34, and receives a satellite signal transmitted from the positioning satellite and detects a position based on the received satellite signal. A connecting portion 35 to connect a connection terminal of a harness is provided rightward of the position detector 30 (refer to FIG. 9).

As depicted in FIG. 4 and FIG. 5, the support frame 38 includes a first bar 39 and a second bar 40 extending in the vehicle width direction B3, a first frame stay 41L provided on one end (left end) side in the vehicle width direction B3 of the first bar 39 and the second bar 40, and a second frame stay 41R provided on the other end (right end) side in the vehicle width direction B3 of the first bar 39 and the second bar 40. The first bar 39 and the second bar 40 each include, for example, a rod-shaped member such as a pipe member, and are juxtaposed in the fore-and-aft direction A3 above the roof 16.

As depicted in FIG. 2 and FIG. 4, the first bar 39 includes a first linear bar portion 39a, a first vertical bar portion 39b, and a second vertical bar portion 39c. The first linear bar portion 39a is disposed above a front portion of the roof 16. In detail, the first linear bar portion 39a extends linearly in the vehicle-width direction B3 so as to be interposed between a top of the first front pillar 36L and a top of the second front pillar 36R. The first vertical bar portion 39b is extended downward from a left end of the first linear bar portion 39a. The second vertical bar portion 39c is extended downward from a right end of the first linear bar portion 39a.

As depicted in FIG. 2 and FIG. 5, the second bar 40 includes a second linear bar portion 40a, a first tilted portion 40b, a second tilted portion 40c, a third vertical bar portion 40d, and a fourth vertical bar portion 40e. The second linear bar portion 40a is disposed above the roof 16 and below the first linear bar portion 39a. Also, the second linear bar portion 40a is spaced from the first linear bar portion 39a and is substantially parallel to the first linear bar portion 39a. The first slant portion 40b extends forwardly leftward slantwise from one end (left end) of the first linear bar portion 39a. A left end of the first tilted portion 40b is disposed rearward of a left end of the first linear bar portion 39a. The second slant portion 40c extends forwardly rightward slantwise from the other end (right end) of the second linear bar portion 40a. A right end of the second tilted portion 40c is disposed rearward of a right end of the first linear bar portion 39a. The third vertical bar portion 40d is extended downward from a left end of the first tilted portion 40b. The fourth vertical bar portion 40e is extended downward from a right end of the second tilted portion 40c.

As depicted in FIG. 4 and FIG. 5, the first frame stay 41L and the second frame stay 41R each include a plate-shaped member. An upper portion of the first frame stay 41L is interposed between the first vertical bar portion 39b and the third vertical bar portion 40d and is fixed to the first vertical bar portion 39b and the third vertical bar portion 40d. An upper portion of the second frame stay 41R is interposed between the second vertical bar portion 39c and the fourth vertical bar portion 40e and is fixed to the second vertical bar portion 39c and the second vertical bar portion 40e.

As depicted in FIG. 4, one end side of the support frame 38 is mounted on an upper portion of the first front pillar 36L, and the other end side is mounted on an upper portion of the second front pillar 36R. In detailed description, a first mounting tab 42L is fixed to the upper portion of the first front pillar 36L, and a second mounting tab 42R is fixed to the upper portion of the second front pillar 36R. The first mounting tab 42L and the second mounting tab 42R each include a plate. The first mounting tab 42L protrudes leftwardly forward slantwise from a front portion of the first front pillar 36L. The second mounting tab 42R protrudes rightwardly forward slantwise from a front portion of the second front pillar 36R. The first frame stay 41L is mounted on the first mounting tab 42L with a bolt and a nut, and the second frame stay 41R is mounted on the second mounting tab 42R with a bolt and a nut.

As depicted in FIG. 4 and FIG. 5, a first side mirror 43L is disposed leftwardly sideward of the upper portion of the first front pillar 36L, and a second side mirror 43R is disposed rightwardly sideward of the upper portion of the second front pillar 36R. The first side mirror 43L and the second side mirror 43R are mirrors to visually recognize rearward and rearwardly sideward of the vehicle body 5. The first side mirror 43L and the second side mirror 43R each include a mirror main body 43a, a bracket arm 43b to support the mirror main body 43a, and a mounting part 43c to support the bracket arm 43b rotatably about a vertical axis. The mounting part 43c of the first side mirror 43L is fixed to the first mounting tab 42L. The mounting part 43c of the second side mirror 43R is fixed to the second mounting tab 42R. Also, a radio antenna 44 is mounted on the second mounting tab 42R.

As depicted in FIG. 2, FIG. 4, and FIG. 5, the support frame 38 includes a support bracket 45 to support the position detector 30. The support bracket 45 is provided on substantially central portions in the vehicle width direction B3 of the first bar 39 and the second bar 40.

As depicted in FIG. 6 to FIG. 10, the support bracket 45 includes a base stay 46 to be mounted on a vehicle body 5 side and a mounting stay 47 pivotally supported and coupled to the base stay 46. The base stay 46 and the mounting stay 47 each include a plate.

Figure 8:
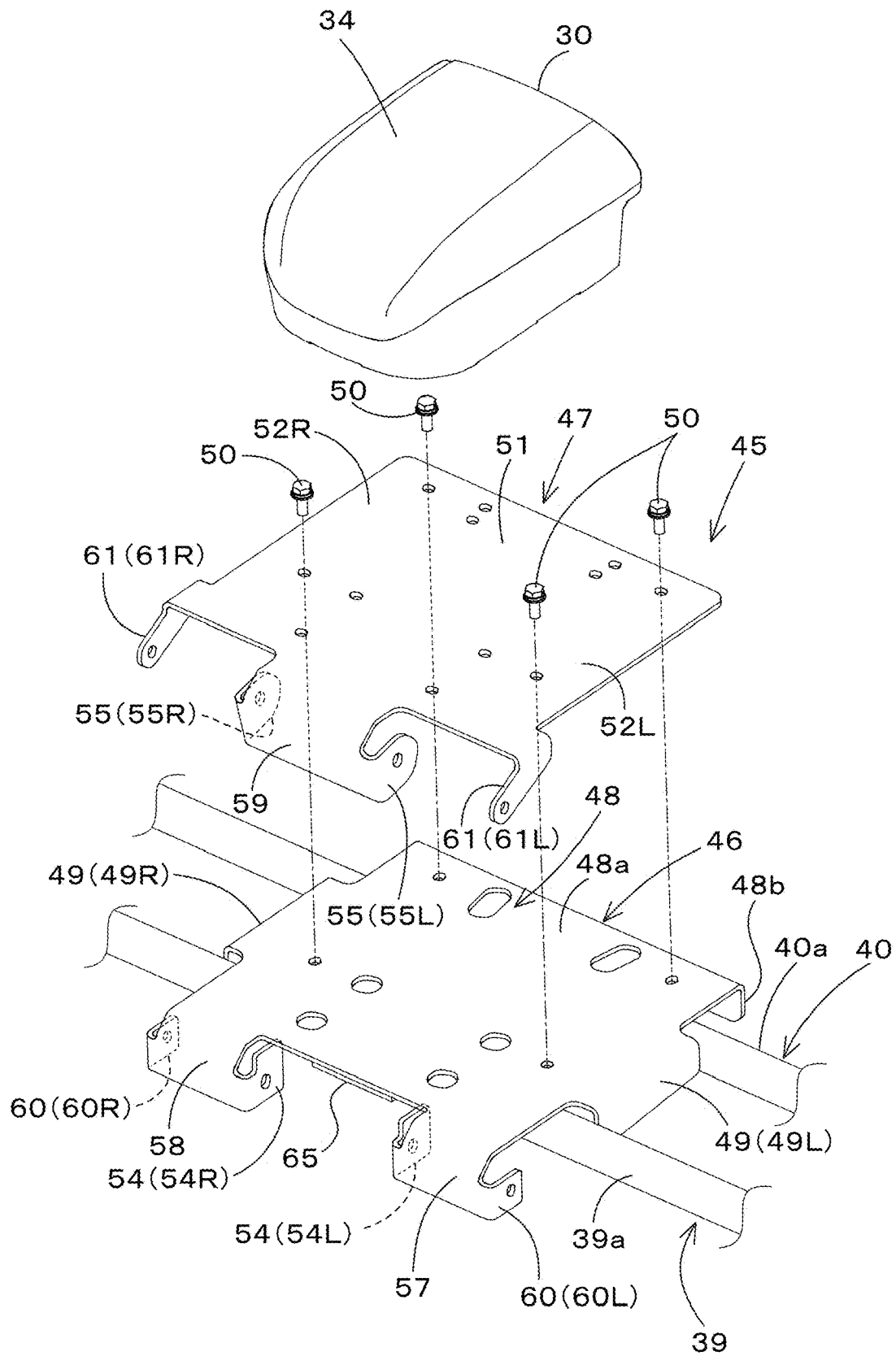
FIG. 8 is an exploded perspective view of a support bracket.
Figure 9:
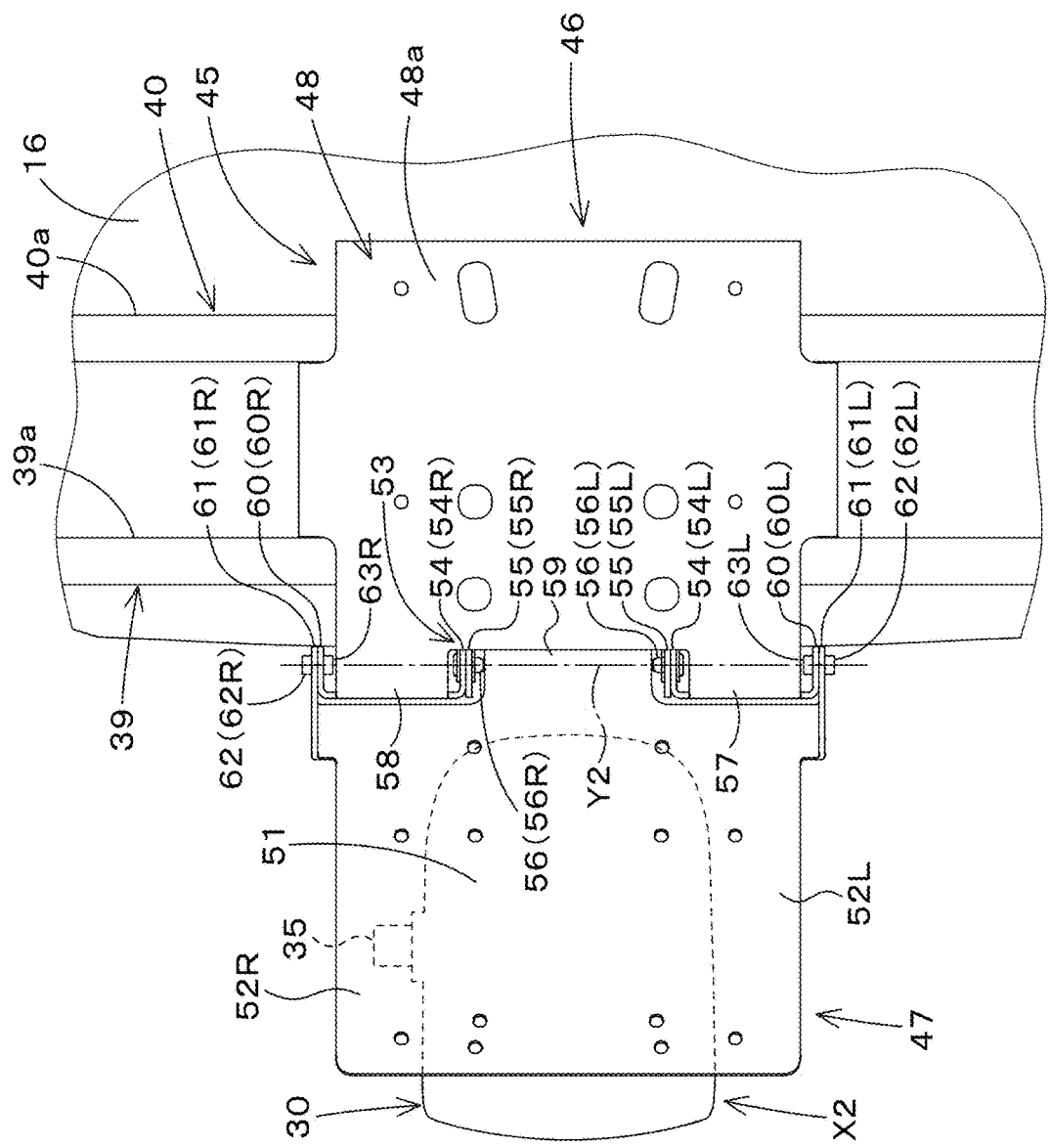
FIG. 9 is a plan view with the position detector being in a second position.

As depicted in FIG. 8 and FIG. 9, the base stay 46 includes a base plate portion 48 provided on the first bar 39 and the second bar 40 and an extending portion 49 extending downward from the base plate portion 48 and between the first bar 39 and the second bar 40. A main body portion 48a of the base plate portion 48 is formed in a rectangular shape in plan view, and is fixed to the first bar 39 and the second bar 40. A rear portion of the base plate portion 48 is bent downward. In detail, the base plate portion 48 includes a wall portion 48b extending downward from a rear end of the main body portion 48a. The extending portion 49 includes a first extending wall 49L extending downward from a midway portion in the fore-and-aft direction A3 of a left end of the base plate portion 48 and a second extending wall 49R extending downward from a midway portion in the fore-and-aft direction A3 of a right end of the base plate portion 48. The first extending wall 49L and the second extending wall 49R are fixed to the first bar 39 and the second bar 40. With the base stay 46 having the first extending wall 49L and the second extending wall 49R, the base stay 46 can be firmly mounted on the first bar 39 and the second bar 40.

Figure 6:
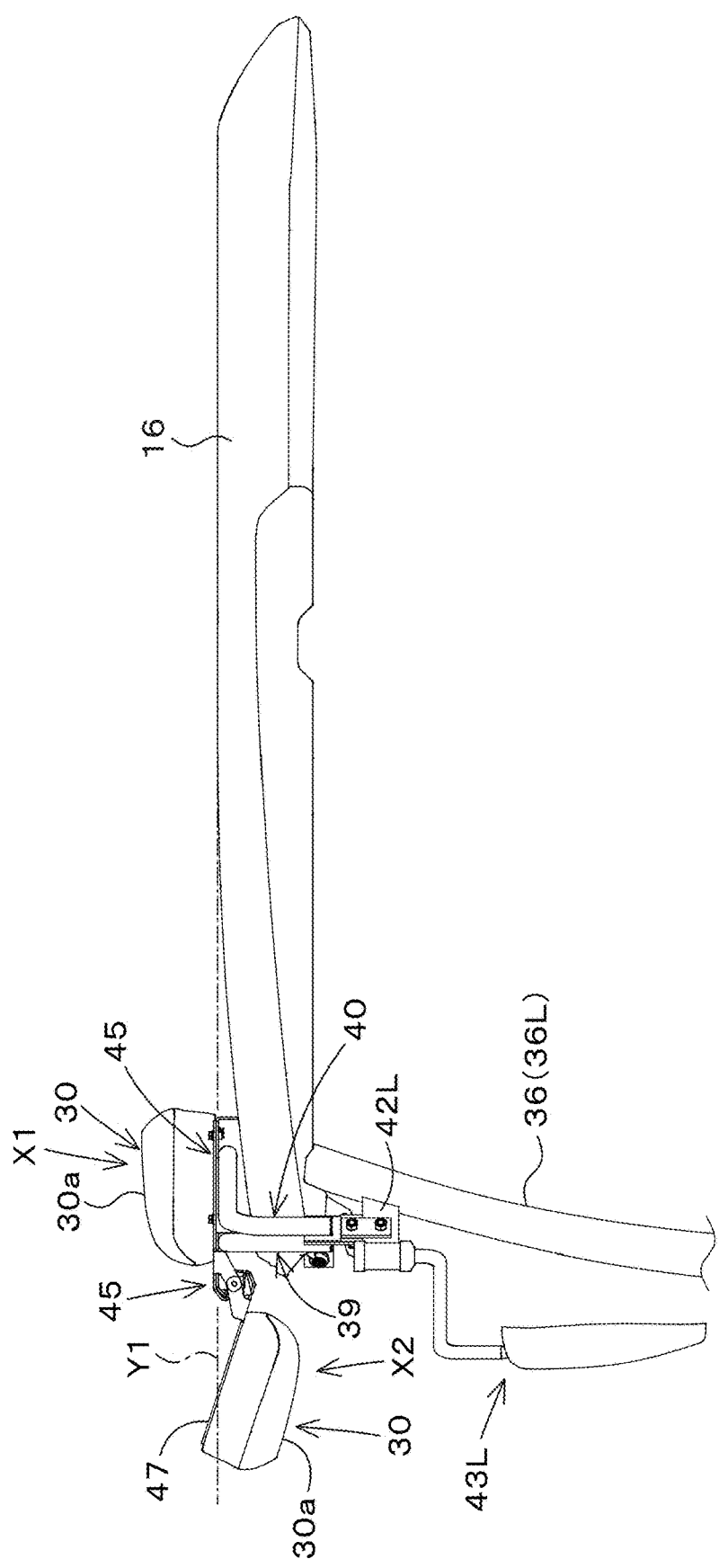
FIG. 6 is a side view of an upper portion of the cabin.
Figure 7:
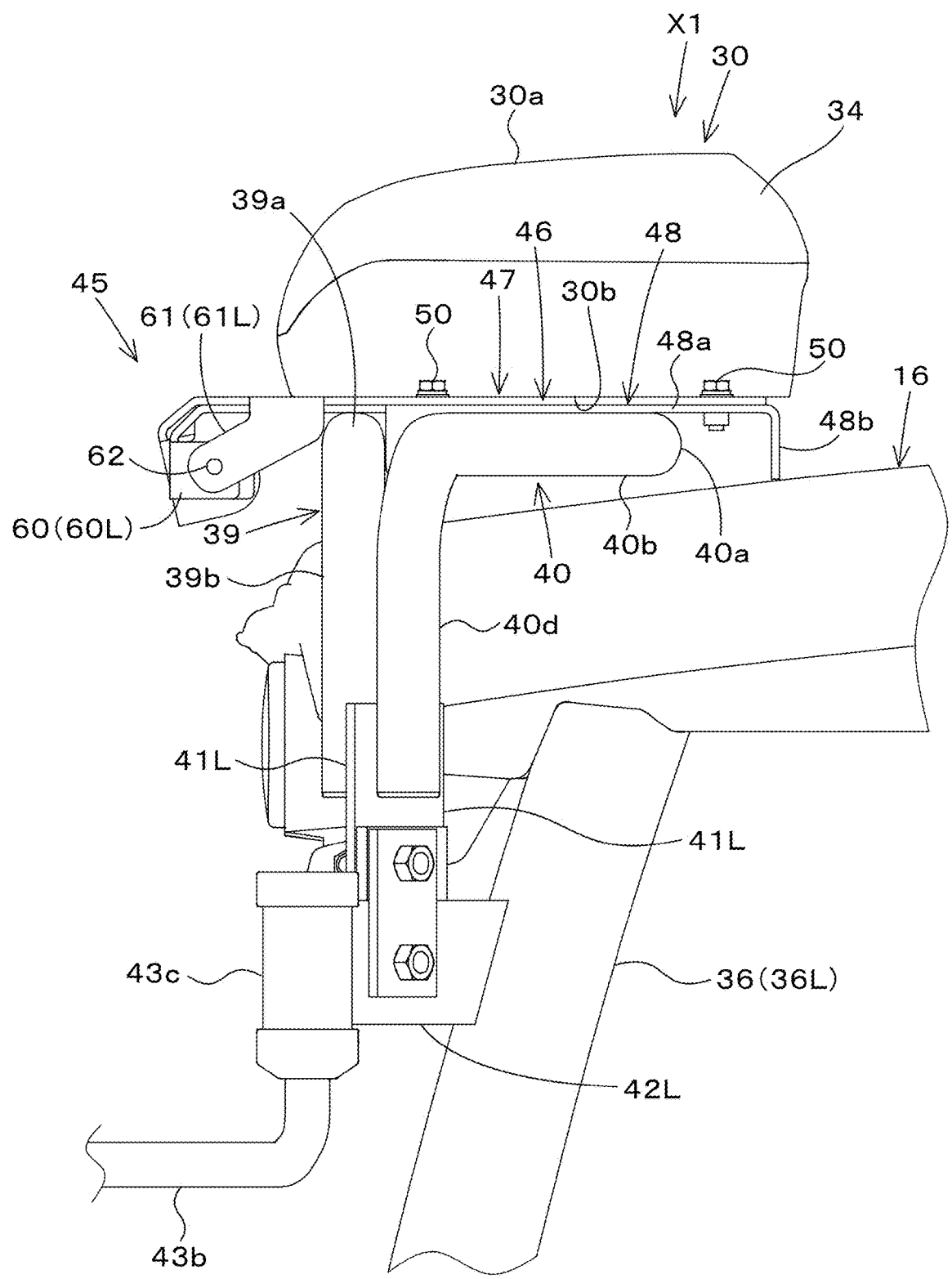
FIG. 7 is a side view of an upper portion of a front portion of the cabin.

As depicted in FIG. 7, the position detector 30 is mounted on the mounting stay 47 with bolts. As depicted in FIG. 6, the mounting stay 47 is pivotally supported by a front portion of the base stay 46 so as to be rotatable about an axis extending in the vehicle width direction B3 so that, by rotating the mounting stay 47, the position detector 30 is moved between a first position X1, which is a position for use, and a second position X2, which is a position lower than the first position. That is, the support bracket 45 supports the position detector 30 shiftable to the first position X1 and the second position X2. Also, with rotation of the mounting stay 47, the position detector 30 flips from the first position X1 to the second position X2 and, the position detector 30, when in the second position X2, is in a downward-facing state in which an upper surface 30a side of the position detector 30 when in the first position X1 comes to face downward. Therefore, with the position detector 30 moved from the first position X1 to the second position X2 when unused, the position detector 30 can be prevented from hitting an obstacle. Also, only by rotating the mounting stay 47, the second position X2 can be set at a position sufficiently lower than the first position X1.

In the present preferred embodiment, the position detector 30 is tilted in a manner such that a side of the position detector 30 having been disposed as the upper surface 30a comes to face downward and to tilt forwardly upward when the position detector 30 is in the second position X2.

As depicted in FIG. 7, the mounting stay 47 is disposed downward of the position detector 30 when the position detector 30 is in the first position X1. Therefore, a side of the position detector 30 disposed as a lower surface 30b is attached to the mounting stay 47. Also, the mounting stay 47 is placed on the base stay 46 (base plate portion 48) when the position detector 30 is in the first position X1. In this state, the mounting stay 47 is mounted on the base stay 46 with bolts 50 (refer to FIG. 8). Note that nuts into which the bolts 50 are screwed are fixed to a lower surface of the base stay 46.

As depicted in FIG. 9, the mounting stay 47 includes a main plate portion 51 on which the position detector 30 is mounted, a first extending plate portion 52L extending in one lateral direction (leftward) from the main plate portion 51, and a second extending plate portion 52R extending in the other lateral direction (rightward) from the main plate portion 51.

Figure 10:
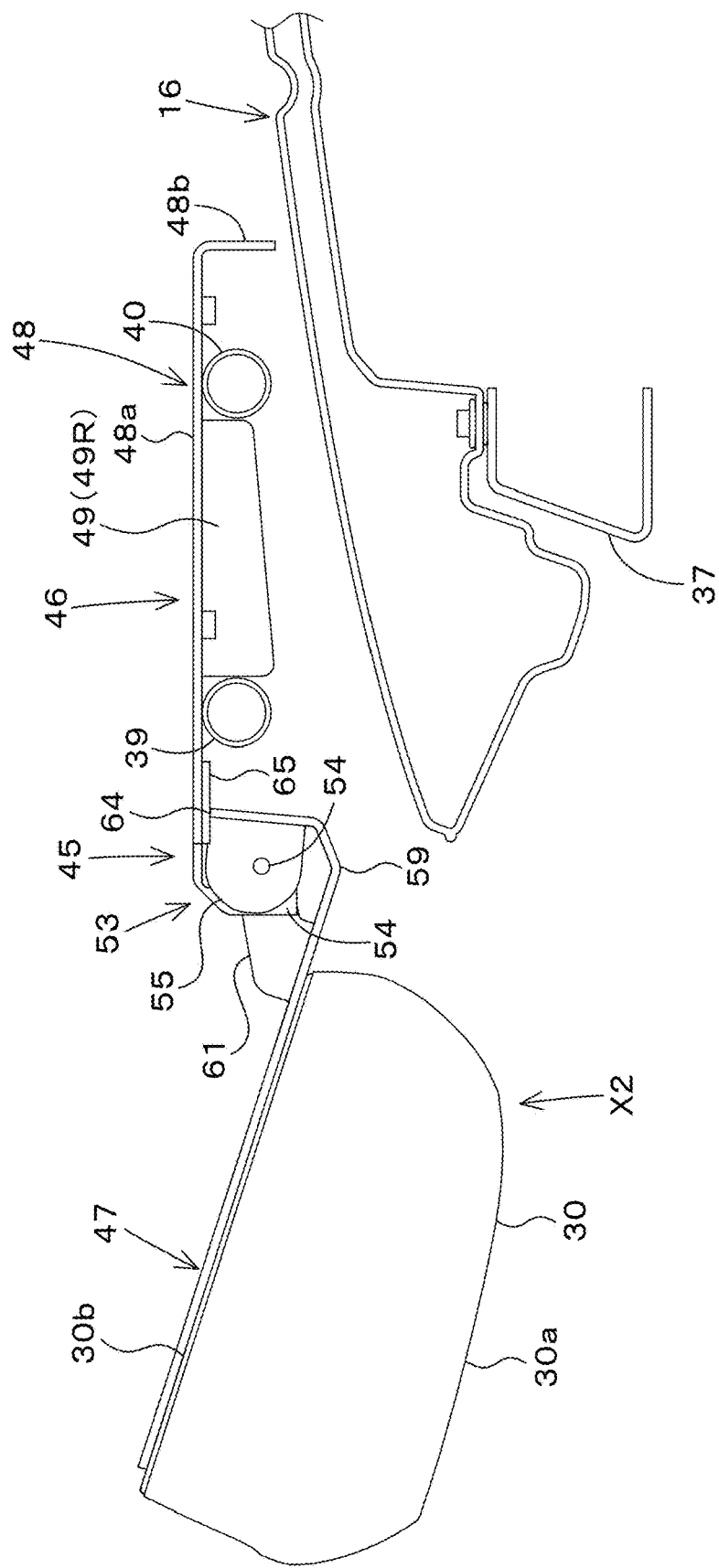
FIG. 10 is a side sectional view with the position detector being in the second position.

As depicted in FIG. 9 and FIG. 10, when the position detector 30 is in the second position X2, the mounting stay 47 covers the position detector 30 (the receiver 31, the wireless transceiver 32). Also, the mounting stay 47 reflects a satellite signal. Therefore, when the position detector 30 is in the second position X2, it is in the state where a satellite signal cannot be effectively received. That is, when the position detector 30 is in the second position X2, automatic steering control is restrained by the mounting stay 47. In other words, the mounting stay 47 defines and functions as a restraint to restrain automatic steering control by covering over the position detector 30 in the second position X2. When the position detector 30 is in the second position X2, by restraining automatic steering control by the mounting stay 47, it is possible to prevent working with automatic control steering from being performed.

The mounting stay 47 includes, for example, a metal plate such as an iron plate.

As depicted in FIG. 6, the position detector 30, when in the first position X1, is disposed on an upward side of the roof 16, and, when in the second position X2, is mostly positioned downward of an upper end of the roof 16 and partially in a position higher than the upper end of the roof 16. In FIG. 6, a one-dot-chain line indicates an extension line Y1 of an uppermost end of the roof 16. In the exemplary drawing, an upper front portion of the position detector 30 in the second position X2 is at a position higher than the extension line Y1.

As depicted in FIG. 5 and FIG. 10, the support frame 38 includes a hinge 53 which pivotally couples the mounting stay 47 to the base stay 46 so that the mounting stay 47 is rotatable about the axis extending in the vehicle width direction B3.

The hinge 53 includes, as depicted in FIG. 8 and FIG. 9, fixed-side hinge tabs 54 provided on the base stay 46, movable-side hinge tabs 55 provided on the mounting stay 47, and a pivotal shaft 56 pivotally coupling the movable-side hinge tabs 55 to the fixed-side hinge tabs 54.

The fixed-side hinge tabs 54 include a first hinge tab 54L and a second hinge tab 54R. The base stay 46 is provided at a left front end portion thereof with a first extended portion 57. The first extended portion 57 extends forward from the base stay 46 and then extend downward. The first hinge tab 54L extends rearward from a right portion of the first extended portion 57. Also, the base stay 46 is provided at a right front end portion thereof with a second extended portion 58. The second extended portion 58 extends forward from the base stay 46 and then extend downward. The second hinge tab 54R extends rearward from a left portion of the second extended portion 58. The first hinge tab 54L and the second hinge tab 54R are opposed and spaced from each other in the vehicle width direction B3.

The movable-side hinge tabs 55 include a third hinge tab 55L and a fourth hinge tab 55R. The mounting stay 47 is provided at a central portion in the vehicle width direction B3 of the front end portion thereof with a third extended portion 59. The third extended portion 59 extends forward from the mounting stay 47 and then extends downward. The third extended portion 59 is disposed between the first extended portion 57 and the second extended portion 58. The third hinge tab 55L is extended rearward from a left portion of the third extended portion 59 and is opposed to the first hinge tab 54L. The fourth hinge tab 55R is extended rearward from a right portion of the third extended portion 59 and is opposed to the second hinge tab 54R.

As depicted in FIG. 9, the pivotal shaft 56 includes a first pin 56L pivotally supporting and coupling the first hinge tab 54L and the third hinge tab 55L together and a second pin 56R pivotally supporting and coupling the first hinge tab 54L and the third hinge tab 55L together. The first pin 56L and the second pin 56R are disposed on the same axis Y2.

As depicted in FIG. 8, the support bracket 45 includes fixed tabs 60 provided on the base stay 46, movable tabs 61 provided on the mounting stay 47, and attachment screws 62 to mount the movable tabs 61, the attachment screws 62 being on the fixed tabs 60 (refer to FIG. 9).

The fixed tabs 60 include a first tab 60L provided on a front left end portion of the base stay 46 and a second tab 60R provided on a front right end portion of the base stay 46. The first tab 60L is extended rearward from a left portion of the first extended portion 57. The second tab 60R is extended rearward from a right portion of the second extended portion 58.

The movable tabs 61 include a third tab 61L provided on a front left end portion of the mounting stay 47 and a fourth tab 61R provided on a front right end portion of the mounting stay 47. The third tab 61L extends leftwardly slantwise from the mounting stay 47 and then extends downwardly forward. The third tab 61L is disposed outward in the vehicle width direction of the first tab 60L. The fourth tab 61R extends leftwardly slantwise from the mounting stay 47 and then extends downwardly forward. The fourth tab 61R is disposed outward in the vehicle width direction of the second tab 60R.

As depicted in FIG. 9, the attachment screws 62 include a first screw 62L which fixes the third tab 61L to the first tab 60L and a second screw 62R which fixes the fourth tab 61R to the second tab 60R. The attachment screws 62 (first screw 62L, second screw 62R) are provided on the axis Y2 substantially coaxial to the pivotal shaft 56. With this, only loosening the attachment screws 62 can rotate the mounting stay 47. In other words, the mounting stay 47 can be rotated even without removing the attachment screws 62. Also, the mounting stay 47 can be fixed also in any rotation position.

On a surface of the first tab 60L on an inner side in the vehicle width direction, a first nut member 63L into which the first screw 62L is screwed is fixed. On a surface of the second tab 60R on an inner side in the vehicle width direction, a second nut member 63R into which the second screw 62R is screwed is fixed.

As depicted in FIG. 10, an end portion of the third extended portion 59 defines and functions as a restricting portion 64 which abuts against the base stay 46 when the position detector 30 is in the second position X2, thus restricting forward rotation of the mounting stay 47. An abutting member 65 is provided at a location on a lower surface of the base stay 46 where the restricting portion 64 abuts. The abutting member 65 includes an elastic plate made of rubber or the like. With the abutting member 65 where the restricting portion 64 abuts formed of an elastic plate, shock by abutting of the restricting portion 64 on the base stay 46 side can be absorbed by the abutting member 65.

Figure 11:
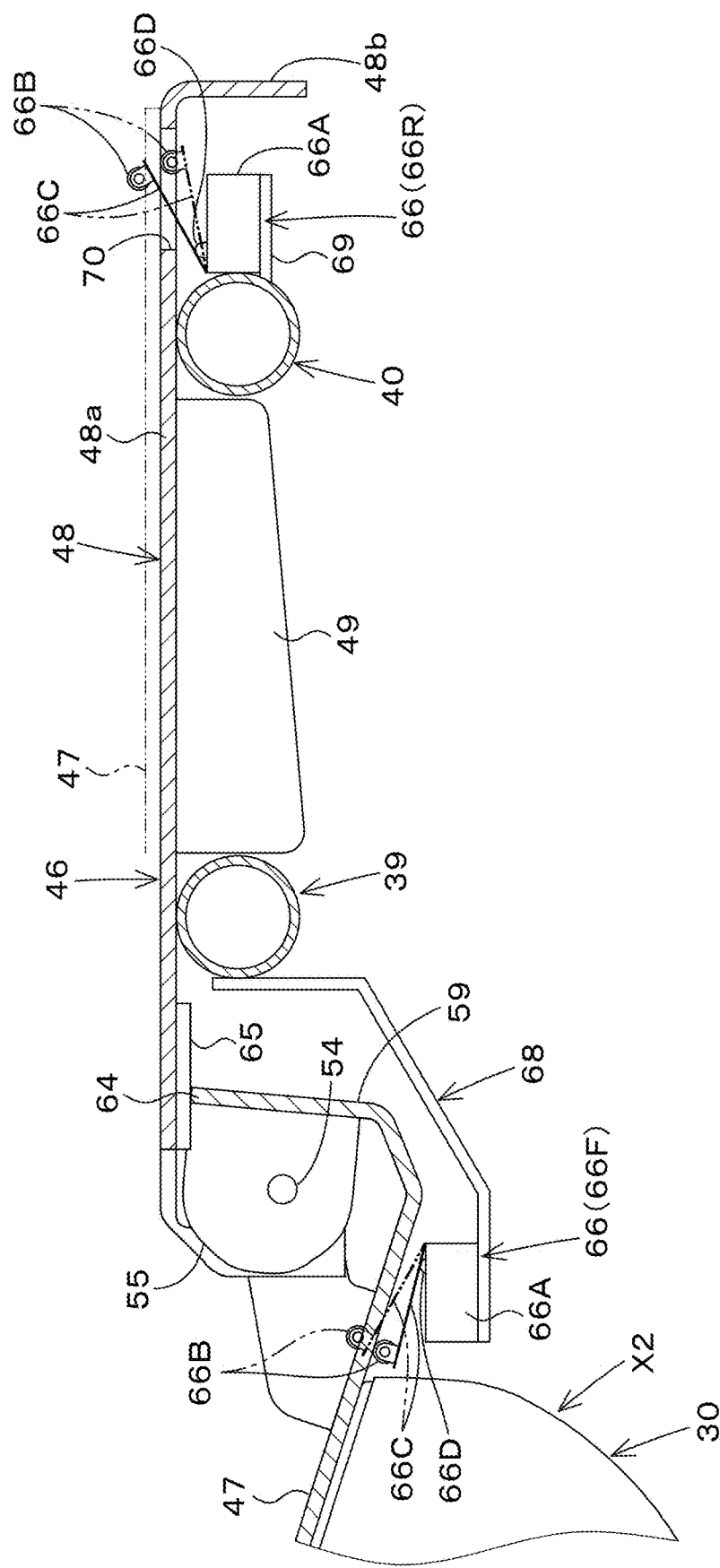
FIG. 11 is a side sectional view of a support bracket attachment portion according to a modification example of a preferred embodiment of the present invention.
Figure 12:
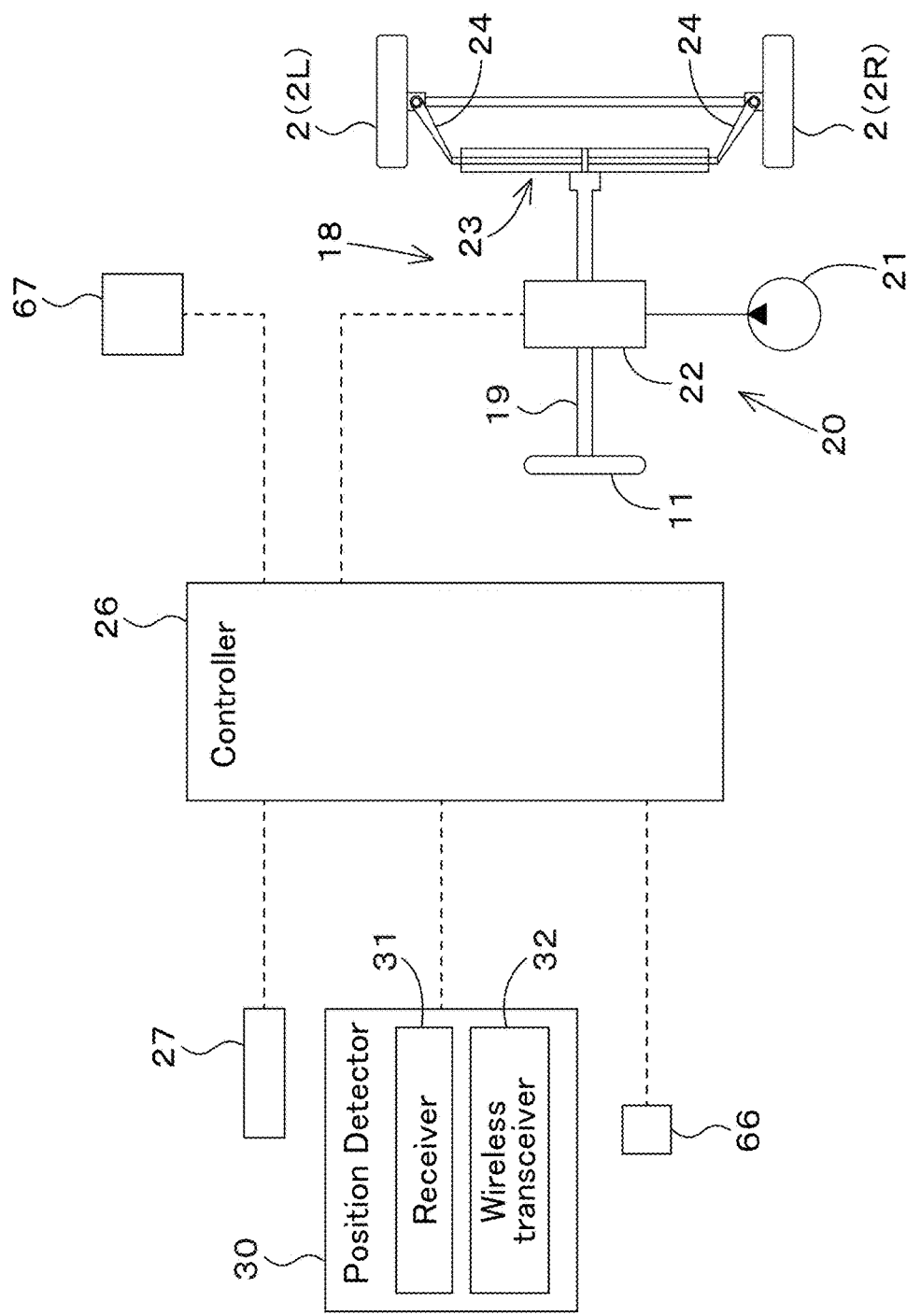
FIG. 12 is a structural diagram depicting a partial structure and a control-system block diagram of a working vehicle according to a modification example of a preferred embodiment of the present invention.

FIG. 11 and FIG. 12 depict a modification example of the above-described preferred embodiment. This modification example includes a detection sensor 66 which detects that the position detector 30 is in the second position X2 and a display 67 which displays that the detection sensor 66 has detected that the position detector 30 is in the second position X2.

As depicted in FIG. 11, the detection sensor 66 includes, for example, a microswitch. FIG. 11 depicts an example in which the detection sensor 66 is mounted on a front portion or a rear portion of the support bracket 45. The detection sensor 66 includes a sensor main body 66A, a lever 66C including a tip portion where a roller 66B is mounted, and a button 66D.

A front-side detection sensor 66F is mounted on a sensor bracket 68 disposed forwardly downward of the hinge 53 and fixed to the first bar 39. In this detection sensor 66F, when the position detector 30 is moved to the second position X2, the third extended portion 59 abuts on the roller 66B to push and move the roller 66B, thus causing the lever 66C to swing and push the button 66D. With this, it is detected that the position detector 30 is in the second position X2.

A rear-side detection sensor 66R is mounted on a sensor bracket 69 disposed rearward of the second bar 40 and downward of the base stay 46 and fixed to the second bar 40. In the base stay 46, an opening hole 70 is formed to cause the roller 66B to protrude upward from the base stay 46. In this detection sensor 66R, when the position detector 30 is in the first position X1, the mounting stay 47 pressurizes the roller 66B and the lever 66C pressurizes the button 66D. When the mounting stay 47 placed on the base stay 46 rotates upward and then rotates forward to cause the position detector 30 to be moved from the first position X1 to the second position X2, the mounting stay 47 moves away from the roller 66B, and the lever 66C ceases pressurization of the button 66D. With this, it is detected that the position detector 30 is in the second position X2.

Note that it is only required that at least one detection sensor 66 be provided, but a plurality of detection sensors may be provided. The mounting location where the detection sensor 66 is mounted is not limited to the location depicted in FIG. 11. Also, it may be detected that the position detector 30 is in the second position X2 by directly detecting the position detector 30 by the detection sensor 66. Also, the detection sensor 66 may be a sensor of a contact-type detection scheme other than a microswitch. Also, the detection sensor 66 may be a sensor (proximity sensor) of a non-contact-type detection scheme capable of detecting that the position detector 30 is in the second position X2 without making contact with the mounting stay 47, the position detector 30, or the like.

As depicted in FIG. 12, the detection sensor 66 is connected to the controller 26. The controller 26 can acquire detection information detected by the detection sensor 66. The display 67 is also connected to the controller 26. The display 67 is provided at a location near the operator's seat 10 so as to be visually recognized by the operator with ease. The display 67 includes a screen that is a liquid-crystal screen or the like, and it can be displayed on the screen that that the detection sensor 66 has detected the second position X2 of the position detector 30. With this, when the position detector 30 is in the second position X2, it is possible to let the operator recognize that automatic steering control cannot be performed. Note that the operator may be notified by a buzzer, voice, or the like that the position detector 30 is in the second position X2.

Structures of the present example other than the above-mentioned structures are configured similar to those of the above-described preferred embodiment.

Figure 13:
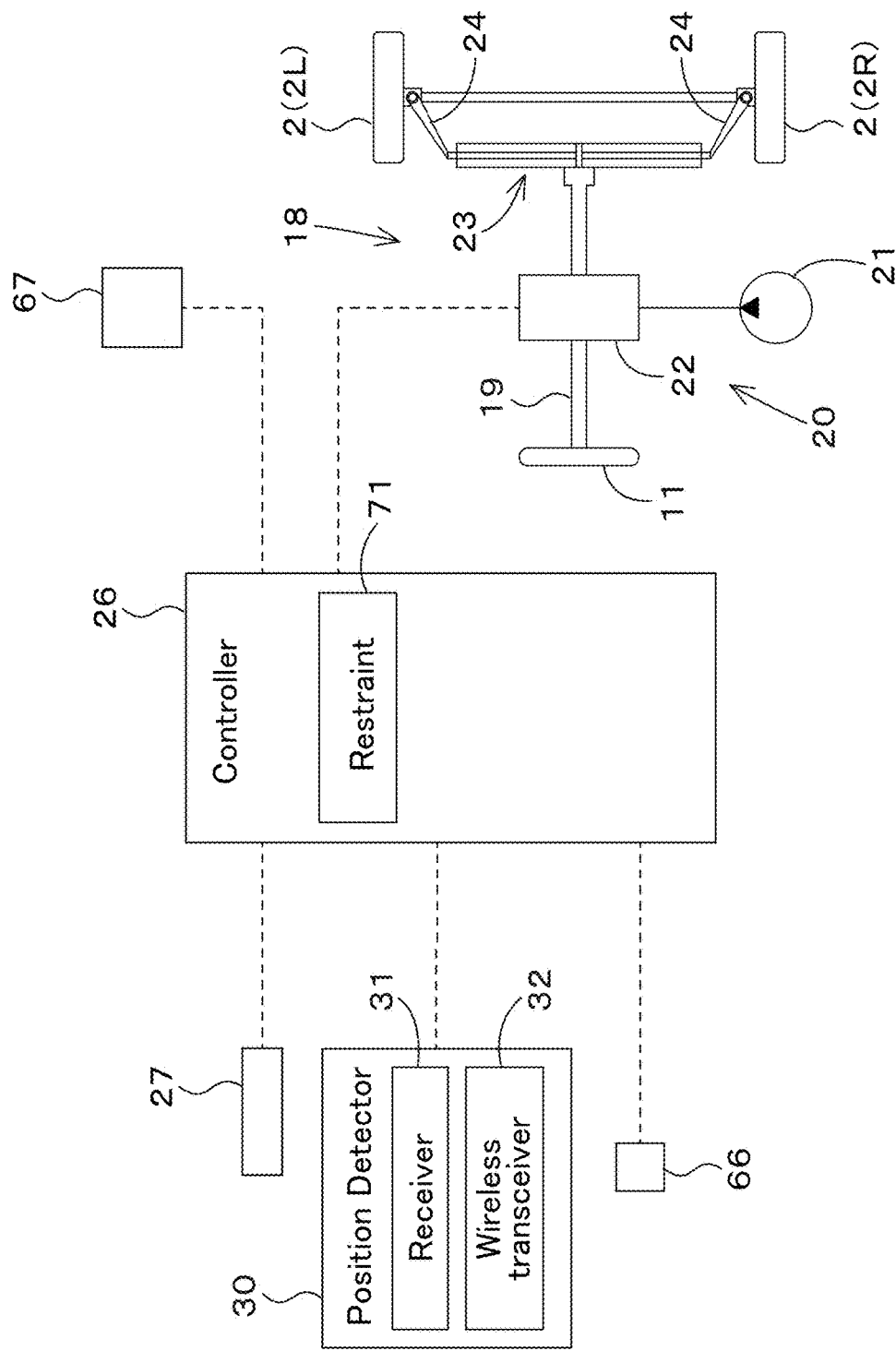
FIG. 13 is a structural diagram depicting a partial structure and a control-system block diagram of a working vehicle according to another preferred embodiment of the present invention.
Figure 14:
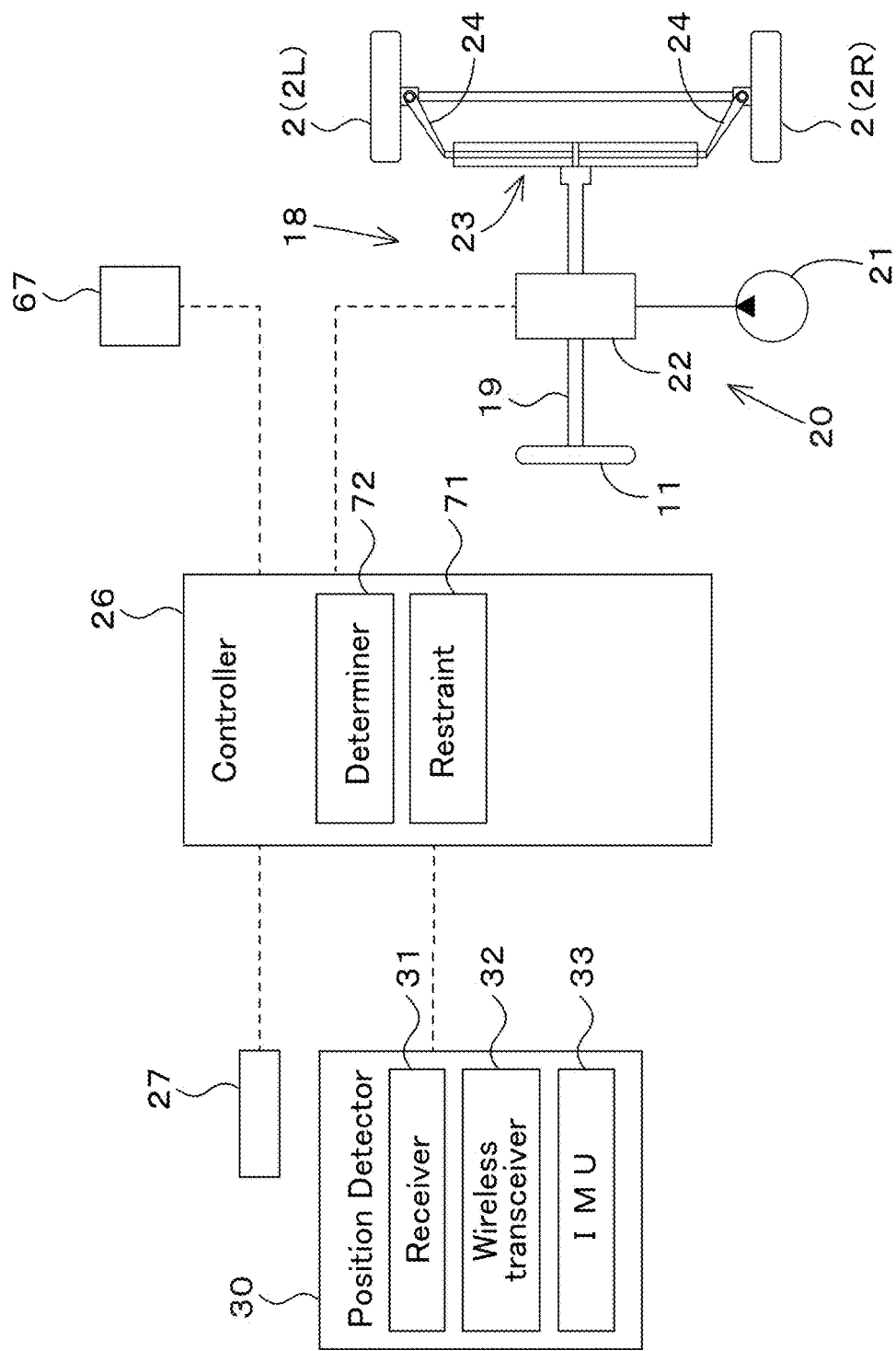
FIG. 14 is a structural diagram depicting a partial structure and a control-system block diagram of a working vehicle according to still another preferred embodiment of the present invention.

FIG. 13 and FIG. 14 depict alternative preferred embodiments.

In the alternative preferred embodiment depicted in FIG. 13, the controller 26 is configured or programmed to include a restraint 71. The restraint 71 restrains automatic steering control based on detection information of the detection sensor 66. That is, the restraint 71 does not start automatic steering control when the detection sensor 66 detects the second position X2 of the position detector 30. The display 67 displays that the restraint 71 restrains automatic steering control.

Note that while the material for forming the mounting stay 47 and its shape may not be identical to those of the foregoing preferred embodiments, if the controller 26 includes the restraint 71, the mounting stay 47 may not necessarily be operable to reflect a satellite signal. Also, the width in the vehicle width direction B3 of the mounting stay 47 may not be large. That is, the mounting stay 47 may be narrow.

Structures of the alternative preferred embodiment other than the above-described structures are configured similar to those of the foregoing preferred embodiment and the modification example thereof.

In another preferred embodiment depicted in FIG. 14, the position detector 30 includes the inertial measurement unit (IMU) 33.

The inertial measurement unit 33 includes an acceleration sensor which detects acceleration of gravity, a gyro sensor which detects an angular velocity, and so forth. By this inertial measurement unit 33, it is possible to detect a roll angle, a pitch angle, a yaw angle, and so forth of the vehicle body 5. The controller 26 can acquire detection information detected by the inertial measurement unit 33.

By the inertial measurement unit 33 (the acceleration sensor, the gyro sensor, and so forth), the tilt of the position detector 30 can be detected. That is, the inertial measurement unit 33 is a tilt sensor capable of detecting the tilt of the position detector 30. Therefore, the inertial measurement unit 33 detects a tilt of the position detector 30 when in the second position X2, thereby allowing detection of the existence of the position detector 30 in the second position X2. The position detector 30 is connected to the controller 26 so that the controller 30 can obtain information about detection by use of the inertial measurement unit 33. Thus, the controller 26 can grasp that the position detector 30 is in the second position X2 (faces downward).

The controller 26 is configured or programmed to include a determiner 72 and the restraint 71. The determiner 72 determines, based on the detection information of the inertial measurement unit 33, that the position detector 30 is in the second position X2. The restraint 71 restrains automatic steering control when the determiner 72 determines that the second position X2 of the position detector 30. The display 67 displays that the restraint 71 restrains automatic steering control.

To detect that the position detector 30 is in the second position X2, by using the inertial measurement unit 33 included in the position detector 30, it is possible to simplify the structure and reduce cost.

The working vehicle 1 of the present preferred embodiment may include the vehicle body 5, a position detector 30 to detect a position of the vehicle body 5 based on a signal transmitted from a positioning satellite, the controller 26 configured or programmed to perform automatic steering control in which steering of the vehicle body 5 is automatically controlled based on detection information detected by the position detector 30, and the restraint 47 or 71 to restrain automatic steering control. The position detector 30 can be moved to the first position X1, where the position detector 30 is disposed to be used, and the second position X2, which is a position lower than the first position X1. The restraint 47 or 71 restrains the automatic steering control when the position detector 30 is in the second position.

According to this structure, the position detector 30 when in the second position X2 is prevented from performing the automatic steering control.

Also, the support bracket 45 supports the position detector 30 so as to enable the position detector to be moved between the first position X1 and the second position X2. The support bracket 45 includes the pivotal shaft 56 and the mounting stay 47 that is rotatable around the pivotal shaft 56 and has the lower surface 30b side of the position detector 30, when in the first position X1, mounted thereon. According to rotation of the mounting stay 47 around the pivotal shaft 56, the position detector 30 is moved from the first position X1 to the second position X2 where the side of the position detector 30 having been arranged as the upper surface 30a thereof when the position detector 30 being in the first position X1 comes to face downward. The mounting stay 47 reflects the signal transmitted from the positioning satellite and defines and functions as the restraint that restrains automatic steering control by covering over the position detector 30 in the second position X2.

According to this structure, even if it is not detected that the position detector 30 is in the second position X2, the position detector 30 when in the second position X2 is prevented from performing automatic steering control.

Also, the mounting stay 47 includes the main plate portion 51 onto which the position detector 30 is mounted, the first extending plate portion 52L extending in one lateral direction from the main plate portion 51, and the second extending plate portion 52R extending in the other lateral direction from the main plate portion 51.

According to this structure, the satellite signal can be favorably interrupted when the position detector 30 is in the second position X2.

Also, the detection sensor 66 is provided to detect that the position detector 30 is in the second position X2.

According to this structure, the operator can be notified that the position detector 30 is in the second position X2.

Also, the display 67 is provided to display that the detection sensor 66 has detected the second position X2.

According to this structure, the operator can recognize that the position detector 30 is in the second position X2.

Also, the detection sensor 66 is provided to detect that the position detector 30 is in the second position X2, and the controller 26 includes the restraint 71 which restrains automatic steering control based on the detection information of the detection sensor 66.

According to this structure, the position detector 30 when in the second position X2 is prevented from performing the automatic steering control.

Also, the position detector 30 includes a tilt sensor (inertial measurement unit 33) configured to detect a tilt of the position detector 30, the controller 26 includes the determiner 72, which determines based on the information about detection by use of the tilt sensor 33 that the position detector 30 is in the second position X2, and the restraint 71, which restrains automatic steering control when the determiner 72 determines that the position detector 30 is in the second position X2.

Also according to this structure, the position detector 30 when in the second position X2 is prevented from performing automatic steering control.

Also, the position detector 30 includes the inertial measurement unit 33, and the tilt sensor defines and functions as the inertial measurement unit 33.

According to this structure, the inertial measurement unit 33 included in the position detector 30 detects that the position detector 30 is in the second position X2, thus simplifying the structure to detect that the position detector 30 is in the second position X2.

Also, the display 67 is provided to display that the restraint 71 restrains automatic steering control.

According to this structure, the operator can recognize that automatic steering control is not performed.

Also, the working vehicle 1 may include the vehicle body 5, the position detector 30 to detect a position of the vehicle body 5 based on a signal transmitted from a positioning satellite, and the support bracket 45 to support the position detector 30 so that the position detector 30 is movable to the first position X1, which is a position for use, and the second position X2, which is a position lower than the first position X1. The support bracket 45 includes the base stay 46 mounted on a vehicle body 5 side and the mounting stay 47 pivotally supported by the base stay 46 via the pivotal shaft 56 and on which the lower surface 30b side of the position detector 30 in the first position X1 is mounted. With the mounting stay 47 rotating around the pivotal shaft 56, the position detector 30 is moved from the first position X1 to the second position X2 where the side of the position detector 30 having been arranged as the upper surface 30a thereof when the position detector 30 being in the first position X1 is turned to face downward.

According to this structure, when the position detector 30 is unused, the position detector 30 is moved to the second position X2 lower than the first position X1 for use thereof, thus preventing the position detector 30 from hitting an obstacle. Also, when the position detector 30 is in the second position X2, the side of the position detector 30 having been arranged as the upper surface 30a thereof when the position detector 30 being in the first position X1 comes to face downward, the second position X2 can be sufficiently lower than the first position X1.

Also, when the position detector 30 is in the first position X1, the mounting stay 47 is placed on the base stay 46.

According to this structure, at the time of using the position detector 30, the position detector 30 can be securely supported.

Also, the support bracket 45 includes the fixed-side hinge tabs 54 provided on the base stay 46 and the movable-side hinge tabs 55 provided on the mounting stay 47 and pivotally coupled to the fixed-side hinge tabs 54 via the pivotal shaft 56.

According to this structure, the position detector 30 can be moved from the first position X1 to the second position X2 where the side having been arranged as the upper surface comes to face downward.

Also, the support bracket 45 includes the fixed tabs 60 provided on the base stay 46, the movable tabs 61 provided on the mounting stay 47, and the attachment screws 62 for mounting the movable tabs 61 to the fixed tabs 60. The attachment screws 62 are provided on the axis Y2 substantially coaxial to the pivotal shaft 56.

According to this structure, the mounting stay 47 can be rotated by loosening the attachment screws 62.

Also, the cabin 9 may be mounted on the vehicle body 5, the cabin 9 may have a roof 16 at an upper portion thereof, and the position detector 30, when in the first position X1, may be disposed on an upper side of the roof 16 and, when in the second position X2, may be at least partially in a position higher than the upper end of the roof 16.

Also, the first bar 39 and the second bar 40 extend in the vehicle width direction B3 above the roof and are juxtaposed in the fore-and-aft direction A3. The base stay 46 includes the base plate portion 48 and the extending portion 49. The base plate portion 48 are provided on the first bar 39 and the second bar 40 so that the mounting stay 47 is placed on the base plate portion 48 when the position detector 30 is in the first position X1. The extending portion 49 extends downward from the base plate portion 48 and between the first bar 39 and the second bar 40.

According to this structure, the base stay 46 can be firmly mounted on the first bar 39 and the second bar 40.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle, comprising:
   a travelable vehicle body;
   a position detector to detect a position of the vehicle body based on a signal transmitted from a positioning satellite;
   a controller configured or programmed to perform an automatic steering control in which steering of the vehicle body is automatically controlled based on detection information detected by the position detector;
   a restraint to restrain the automatic steering control; and
   a support bracket to support the position detector; wherein
   the position detector is supported by the support bracket so as to be movable between a first position where the position detector is used and a second position lower than the first position;
   the restraint is operable to restrain the automatic steering control when the position detector is in the second position;
   the support bracket includes a pivotal shaft and a mounting stay rotatable around the pivotal shaft and structured to have the position detector mounted thereon;
   the mounting stay includes a plate that reflects the signal transmitted from the positioning satellite so that the mounting stay defines and functions as the restraint; and
   the mounting stay is disposed below the position detector when the position detector is in the first position, and, when the position detector is rotated from the first position together with the mounting stay around the pivotal shaft, the position detector is moved to the second position and the mounting stay is positioned above the position detector in the second position and covers over the position detector so as to restrain the automatic steering control.

2. The working vehicle according to claim 1, wherein
   the support bracket includes a base stay including a plate that includes a plate surface, the base stay being attached to the vehicle body side so as to face the plate surface up or down; and
   the mounting stay, when the position detector is in the first position, is placed on the base stay and is pivotally supported at a front portion thereof by the base stay via the pivotal shaft so as to be rotatable around an axis of the pivotal shaft extending in a vehicle width direction.

3. The working vehicle according to claim 1, wherein the mounting stay includes:
   a main plate portion attached to the position detector;
   a first extending plate portion extending in one lateral direction from the main plate portion; and
   a second extending plate portion extending in another lateral direction opposite to the one lateral direction from the main plate portion.

4. The working vehicle according to claim 1, wherein the position detector includes a detection sensor to detect that the position detector is in the second position.

5. The working vehicle according to claim 4, further comprising a display to indicate that the detection sensor has detected the second position.

6. The working vehicle according to claim 2, further comprising:
   a cabin mounted on the vehicle body and provided with a roof at an upper portion thereof; and
   a first bar and a second bar each of which extends along the vehicle width direction above the roof and which are juxtaposed forward and rearward; wherein
   the base stay is fixed to the first bar and the second bar.

* * * * *